US012145166B2

(12) United States Patent
Nolte et al.

(10) Patent No.: US 12,145,166 B2
(45) Date of Patent: Nov. 19, 2024

(54) ROTARY ATOMIZER

(71) Applicant: Dürr Systems AG, Bietigheim-Bissingen (DE)

(72) Inventors: Hans-Jürgen Nolte, Besigheim (DE); Andreas Fischer, Gemmrigheim (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 285 days.

(21) Appl. No.: 17/295,357

(22) PCT Filed: Nov. 5, 2019

(86) PCT No.: PCT/EP2019/080268
§ 371 (c)(1),
(2) Date: May 19, 2021

(87) PCT Pub. No.: WO2020/108930
PCT Pub. Date: Jun. 4, 2020

(65) Prior Publication Data
US 2021/0276027 A1 Sep. 9, 2021

(30) Foreign Application Priority Data
Nov. 27, 2018 (DE) ..................... 10 2018 129 964.8

(51) Int. Cl.
*B05B 3/10* (2006.01)
*B05B 15/50* (2018.01)
*B05B 15/555* (2018.01)

(52) U.S. Cl.
CPC .......... *B05B 3/1014* (2013.01); *B05B 3/1042* (2013.01); *B05B 3/1064* (2013.01);
(Continued)

(58) Field of Classification Search
CPC ..... B05B 15/50; B05B 3/1092; B05B 3/1064; B05B 3/1042; B05B 15/555; B05B 3/1014
(Continued)

(56) References Cited

U.S. PATENT DOCUMENTS 4,927,081 A * 5/1990 Kwok .................. B05B 3/1014 239/223
5,707,009 A 1/1998 Schneider
(Continued)

FOREIGN PATENT DOCUMENTS

DE 3000002 A1 7/1981
DE 102009037604 A1 2/2011
(Continued)

OTHER PUBLICATIONS

International Search Report and Written Opinion for PCT/EP2019/080268 mailed Feb. 17, 2020 (16 pages; with English translation).
(Continued)

*Primary Examiner* — Christopher R Dandridge
*Assistant Examiner* — Kevin Edward Schwartz
(74) *Attorney, Agent, or Firm* — Thomas E. Bejin

(57) ABSTRACT

The disclosure relates to a rotary atomizer for applying a spray jet of a coating agent (e.g. paint) to a component (e.g. motor vehicle body component). The disclosure provides that the construction dimensions of the rotary atomizer are coordinated in such a way that the air pressure at the outlet opening of the paint nozzle during operation is lower than the air pressure in the nozzle chamber of the bell cup and in the external rinsing channels in order to prevent a backflow of the coating agent from the outlet opening of the paint nozzle backwards in the direction of the nozzle chamber due to the pressure difference.

22 Claims, 4 Drawing Sheets

(52) U.S. Cl.
CPC ............ *B05B 3/1092* (2013.01); *B05B 15/50* (2018.02); *B05B 15/555* (2018.02)

(58) Field of Classification Search
USPC .......................................................... 239/224
See application file for complete search history.

(56) References Cited

U.S. PATENT DOCUMENTS

| | | | | |
|---|---|---|---|---|
| 6,230,994 | B1 * | 5/2001 | Boerner | B05B 3/1064 118/620 |
| 8,100,347 | B2 * | 1/2012 | Nabeshima | B05B 3/1014 239/113 |
| 8,851,397 | B1 | 10/2014 | Van Der Steur et al. | |
| 8,881,672 | B2 * | 11/2014 | Fischer | B05B 5/0426 118/313 |
| 8,905,325 | B2 | 12/2014 | Ballu et al. | |
| 9,126,217 | B2 | 9/2015 | Nolte et al. | |
| 11,000,947 | B2 * | 5/2021 | Imle | B25J 9/0045 |
| 2006/0219816 | A1 * | 10/2006 | Herre | B05B 15/55 239/290 |
| 2010/0193601 | A1 * | 8/2010 | Nabeshima | B08B 9/00 239/104 |
| 2010/0193602 | A1 * | 8/2010 | Ballu | B05B 3/1014 239/224 |
| 2011/0086166 | A1 * | 4/2011 | Fischer | C23C 16/06 427/248.1 |
| 2012/0137968 | A1 | 6/2012 | Nolte et al. | |
| 2012/0180722 | A1 * | 7/2012 | Nolte | B05B 12/08 118/712 |
| 2014/0246519 | A1 * | 9/2014 | Johnson | B05B 7/2435 239/422 |
| 2018/0200879 | A1 | 7/2018 | Imle | |

FOREIGN PATENT DOCUMENTS

| | | | | | |
|---|---|---|---|---|---|
| DE | 102015009163 | A1 | | 1/2017 | |
| EP | 0715896 | B1 | | 4/2001 | |
| GB | 2066701 | A | * | 7/1981 | B05B 15/025 |
| JP | H07171483 | A | | 7/1995 | |
| JP | 3940445 | B2 | | 7/2007 | |
| JP | 2013501607 | A | | 1/2013 | |
| KR | 100351782 | B1 | | 9/2002 | |

OTHER PUBLICATIONS

German Patent and Trademark Office—Office Action mailed Jul. 11, 2019 for Application No. DE 10 2018 129 964.8 (3 pages).
Korean Intellectual Property Office Notice of Preliminary Rejection for application No. KR10-2021-7019671 mailed Jul. 15, 2023 (15 pages; with English translation).
Korean Intellectual Property Office Notice of Allowance mailed Oct. 5, 2023 for related Application No. KR10-2021-7019671; with English translation (8 Pages).

* cited by examiner

ROTARY ATOMIZER

CROSS-REFERENCE TO RELATED APPLICATIONS

This application is a national stage of, and claims priority to, Patent Cooperation Treaty Application No. PCT/EP2019/080268, filed on Nov. 5, 2019, which application claims priority to German Application No. 10 2018 129 964.8, filed on Nov. 27, 2018, which applications are hereby incorporated herein by reference in their entireties.

FIELD

The disclosure relates to a rotary atomizer for applying a spray jet of a coating agent (e.g. paint) to a component (e.g. motor vehicle body component).

BACKGROUND

Such rotary atomizers are sufficiently known from the state of the art (e.g. EP 0 715 896 B1) and have as application element a bell cup, which is mounted on a bell cup shaft of the rotary atomizer rotating during operation, whereby the bell cup shaft is usually driven by a compressed air turbine. Inside the hollow bell cup shaft, a paint tube runs inside the rotary atomizer to supply the paint to be applied, whereby a paint nozzle is inserted into the end of the paint tube, which discharges the paint in the direction of the bell cup. In the center of the bell cup is a distributor disc holder, to which a distributor disc holder is attached on the front side.

The paint that initially emerges axially from the paint nozzle hits the distributor disc and is largely directed radially outwards onto the overflow surface of the bell cup, so that the paint finally reaches the spray edge of the bell cup and is sprayed off there.

In contrast, part of the paint that initially exits the paint nozzle axially passes through a central hole in the distributor disc to permanently wet the front paint flow surface of the distributor disc with paint.

In addition, the well-known rotary atomizer also features the possibility of external rinsing to rinse the outer circumferential surface of the bell cup with a rinsing agent. For this purpose, the rinsing agent can be introduced into the bell cup via the paint nozzle, which then passes through external rinsing channels into an exterior rinsing chamber at the rear of the bell cup, from where the rinsing agent then flows over the outer circumferential surface of the bell cup.

The above description explains a typical operation of the rotary atomizer, in which the paint emerging from the paint nozzle flows exclusively forward, partly through the central bore in the distributor disc and partly radially outwards onto the overflow surface of the bell cup. In practice, however, it has been shown that under certain operating conditions it can happen that part of the paint emerging from the paint nozzle flows backwards in the bell cup, for example through the exterior rinsing channels into the exterior rinsing chamber of the bell cup or into the nozzle chamber surrounding the paint nozzle. This backflow of paint can lead to contamination of the bell cup and the rotary atomizer and thus to a faulty painting result.

DETAILED DESCRIPTION

Figure 1:
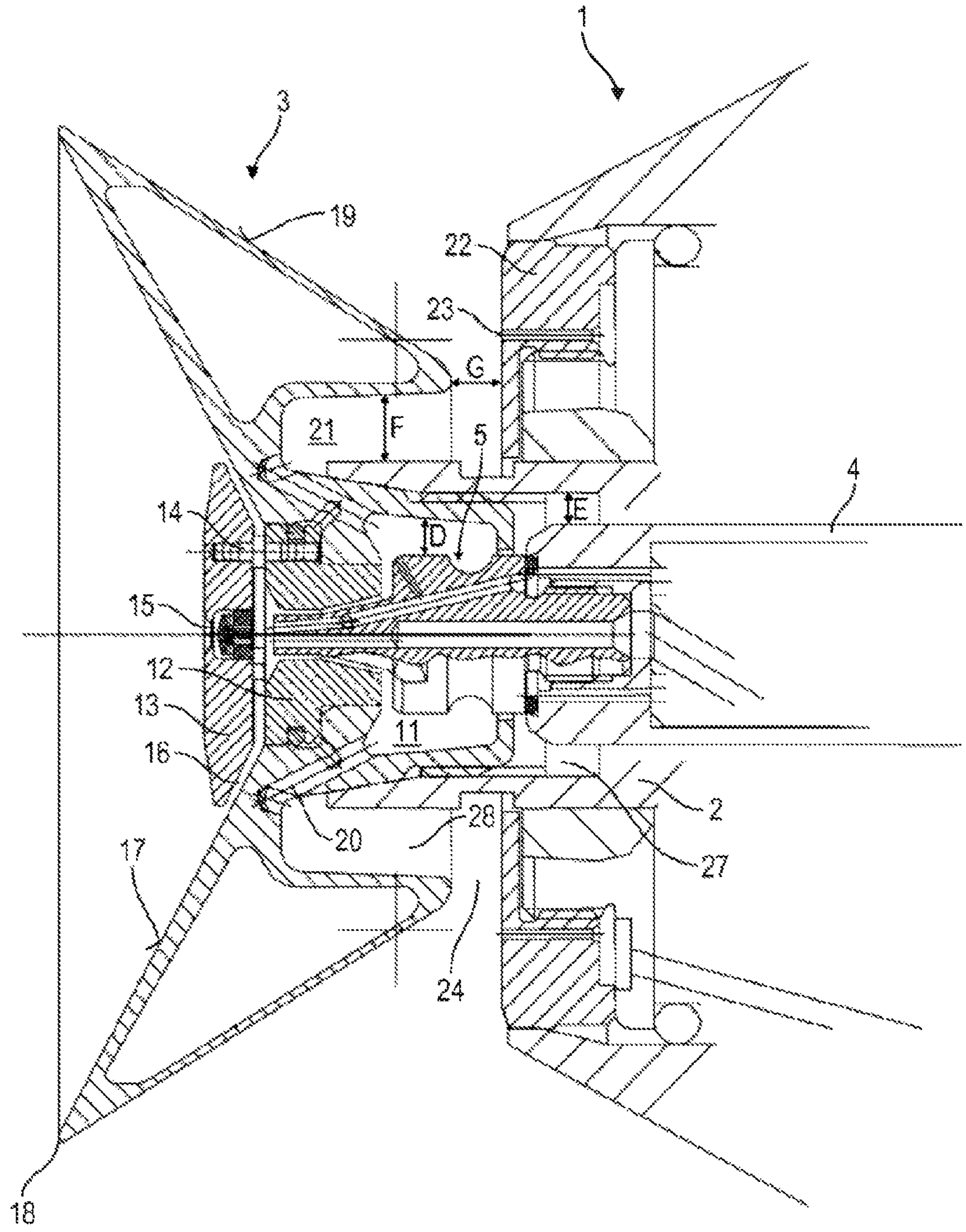
FIG. 1 a cross-sectional view of a rotary atomizer with a bell cup according to the disclosure, FIG. 2 an enlargement from FIG. 1 in the area of the distributor disc holder, FIG. 3 an enlargement from FIG. 2 in the area of the gap between the distributor disc and the overflow surface of the bell cup, FIG. 4 an enlargement from FIG. 1 in the area of the paint nozzle, FIG. 5 an enlargement from FIG. 4 in the area of the outlet opening of the paint nozzle.
Figure 2:
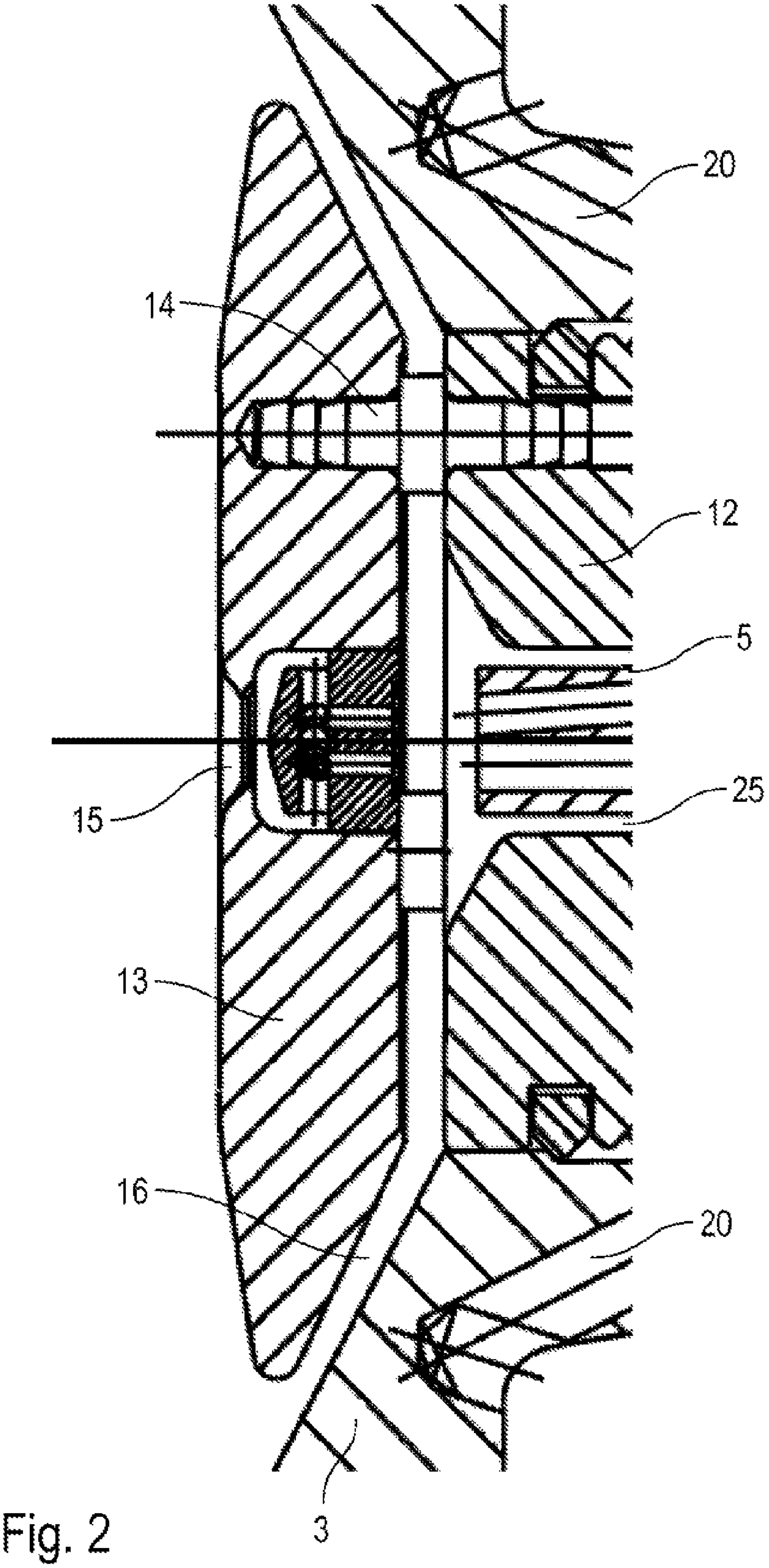
Figure 3:
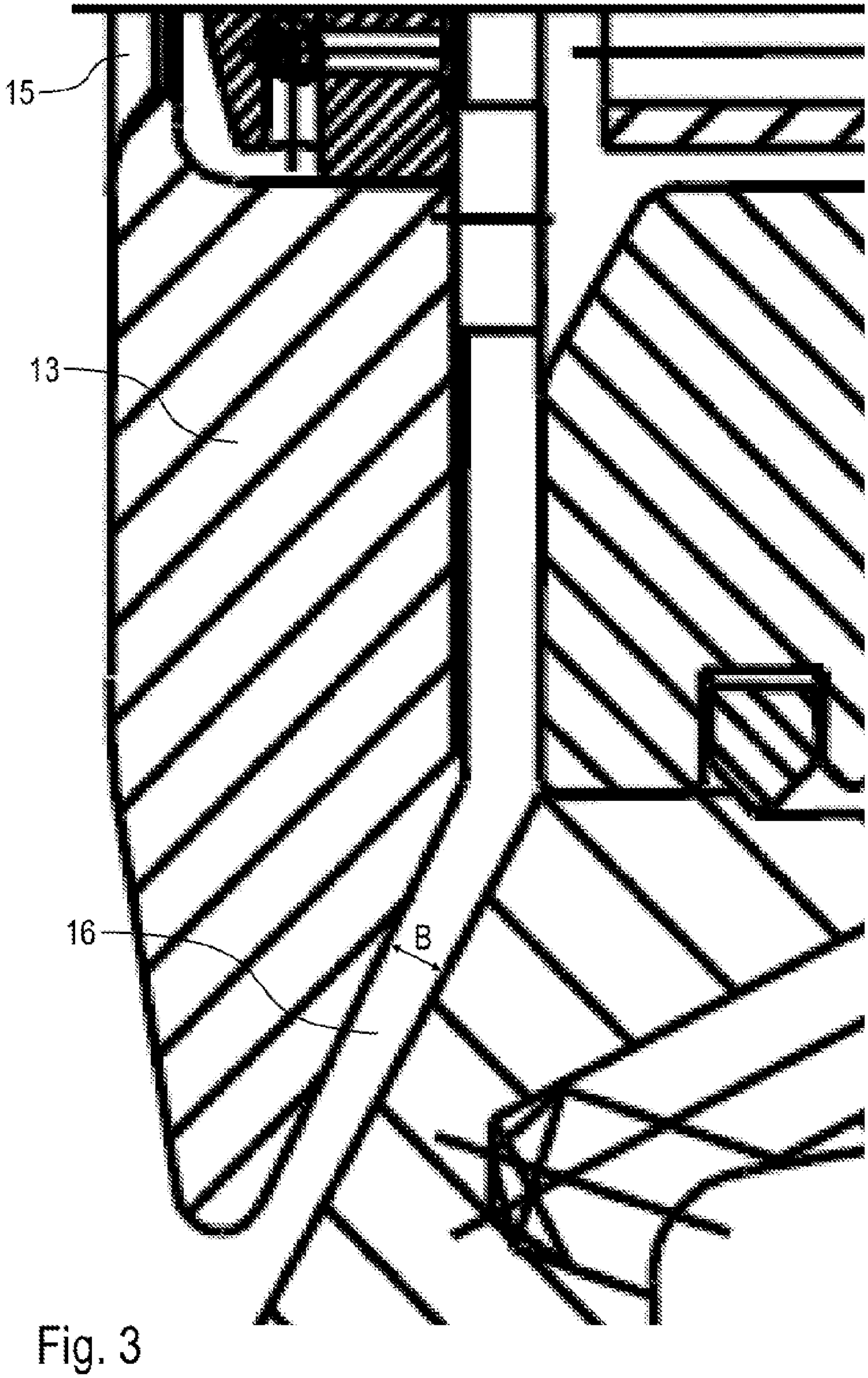

The invention is based on the fluidic knowledge that the disturbing backflow of the paint within the bell cup is caused by unsuitable pressure conditions within the bell cup system.

The disclosure therefore comprises the general technical teaching to design the rotary atomizer and the bell cup system in such a way that the air pressure at the outlet opening of the paint nozzle during operation is always lower than the backward air pressure in the nozzle chamber of the bell cup and in the external rinsing channels in order to avoid a disturbing backward flow of the coating agent from the outlet opening of the paint nozzle backward in the direction of the nozzle chamber by this pressure difference. An overpressure in the nozzle chamber of the bell cup and in the external rinsing channels compared to the air pressure at the outlet of the paint nozzle prevents the coating agent from flowing backwards.

Within the scope of the disclosure it was discovered that different construction dimensions of the rotary atomizer influence the pressure ratio between the air pressure at the outlet opening of the paint nozzle on the one hand and the air pressure in the nozzle chamber of the bell cup and in the external rinsing channels on the other hand. This includes the following design dimensions:

- Cross section of the central bore in the distributor disc of the bell cup,
- diameter of a central bore of the distributor disc holder,
- gap width of the gap between the distributor disc and the overflow surface of the bell cup,
- gap width of the annular gap between the bell cup or the distributor disc holder and the paint nozzle
- gap width of the annular gap between the paint nozzle and the inner wall of the nozzle chamber
- gap width of the annular gap between the bell cup shaft and the internal paint tube,
- gap width of the annular gap of the external rinse chamber on the outside of the bell cup shaft, and
- gap width of the gap between the front side of the shaping air ring and the rear side of the bell cup.

The disclosure therefore preferably provides that the above mentioned design dimensions of the rotary atomizer are matched to each other in such a way that the desired pressure ratios are set in such a way that the air pressure at the outlet opening of the paint nozzle during operation is always lower than the air pressure in the nozzle chamber of the bell cup and in the external rinsing channels in order to avoid the disturbing backflow of the coating agent from the outlet opening of the paint nozzles backwards in the direction of the nozzle chamber.

It should be mentioned that the air pressure at the outlet of the paint nozzle is influenced by the following design dimensions of the rotary atomizer:

- Cross section of the central bore in the distributor disc of the bell cup,
- gap width of the gap between the distributor disc and the overflow surface of the bell cup, gap width of the annular gap between the bell cup and the paint nozzle.

The air pressure in the rear area of the bell cup system (e.g. in the nozzle chamber of the bell cup or in the external rinsing channels), on the other hand, is influenced by the following design dimensions of the rotary atomizer, among other things:

Gap width of the annular gap between the bell cup or the distributor disc holder of the bell cup and the paint nozzle, diameter of the center bore of the distributor disc holder, gap width of the annular gap between the paint nozzle and the inner wall of the nozzle chamber gap width of the annular gap between the bell cup shaft and the internal paint tube, gap width of the annular gap of the external rinse chamber on the outside of the bell cup shaft, and Gap width of the gap between the front side of the shaping air ring and the rear side of the bell cup.

The disclosure therefore preferably provides that the design dimensions of the two groups mentioned above are matched in a suitable manner to achieve the desired pressure ratios.

In a preferred embodiment of the disclosure, the number of external rinsing channels in the bell cup is less than 10, 9, 8, 7, 6 or even less than 5 in order to achieve the pressure ratio to prevent the backflow. It should be mentioned that the external rinsing channels are usually arranged distributed around the circumference of the bell cup and counteract the disturbing backflow by a flow resistance, so that the reduction of the number of external rinsing channels increases the flow resistance and thus contributes to achieving the desired pressure ratio. Correspondingly, the external rinsing channels can have a total cross-sectional area smaller than 4 $mm^2$, 6 $mm^2$, 10 $mm^2$, 15 $mm^2$, 20 $mm^2$, 25 $mm^2$, 30 $mm^2$ or 35 $mm^2$ to achieve the pressure ratio to prevent backflow.

It has proven to be advantageous if the external rinsing channels each have an internal diameter of 1 mm-2 mm, especially essentially 1.5 mm, in order to achieve the pressure ratio to avoid backflow. A too small inner diameter of the external rinsing channels is disturbing here, because this impairs external rinsing processes. A too large diameter of the external rinsing channels, on the other hand, is disturbing because it facilitates the disturbing backflow of paint within the bell cup system. According to the disclosure, the range of the inner diameter of the outer rinsing channels of 1 mm-2 mm is therefore a good compromise.

Furthermore, it should be mentioned that the external rinsing channels preferably each have a total length of 5 mm-15 mm, 7 mm-10 mm or 8 mm-8.7 mm.

It has proven to be advantageous if the external rinsing channels each consist of several (e.g. two) straight tap bores which merge into each other and are angled towards each other. On the one hand, this is advantageous from a manufacturing point of view because the tap holes can be created by drilling. On the other hand, this is also advantageous in terms of flow technology, since the kink in the external rinsing channels counteracts the undesired backflow of the paint.

Preferably, the tap bores leading into the exterior rinsing chamber of the bell cup are shorter than the paint nozzle-side tap bores.

The shorter tap holes leading into the exterior rinsing chamber of the bell cup are then preferably each 0.5 mm-2 mm or 1.0 mm-1.4 mm long. In contrast, the longer tap bores on the color nozzle side preferably have a length of 5 mm-10 mm or 6 mm-8 mm.

Furthermore, the exterior rinsing chamber in the bell cup also influences the pressure conditions in the bell cup system. It has been shown that an enlargement of the outer diameter of the exterior rinsing chamber has a positive effect on the pressure conditions. Preferably the outer diameter of the rinsing chamber in the bell cup is therefore larger than 30.5 mm, 31 mm, 31.5 mm, 32 mm or 32.5 mm.

Another important design dimension is the gap width of the gap between the overflow surface of the bell cup on the one hand and the distributor disc on the other hand. Within the scope of the disclosure, this gap width should preferably be in the range of 0.1 mm-0.25 mm, and in particular in the range of 0.15 mm-0.2 mm.

However, the gap between the overflow surface of the bell cup on the one hand and the distributor disc on the other hand is not only important with regard to its gap width, but also with regard to its gap length in the direction of flow. The gap length of the gap between the overflow surfaces of the bell cup on the one hand and the distributor disc on the other hand is therefore preferably in the range of 3 mm-10 mm, 3.5 mm-7.5 mm or 4.5 mm-5.5 mm.

It has already been mentioned above that the paint nozzle in the bell cup is located in a nozzle chamber, which is formed by the bell cup. It has been found to be advantageous to increase the diameter of the nozzle chamber in order to increase the radial gap width between the paint nozzle on the one hand and the inner wall of the nozzle chamber on the other hand, which also helps to optimize the pressure ratio and to avoid backflow of the paint. The nozzle chamber in the bell cup therefore preferably has a diameter of more than 11 mm, 11.5 mm, 12 mm, 12.5 mm, 13 mm or even more than 13.3 mm. A nozzle chamber diameter of 13.4 mm has proven to be particularly advantageous in each case.

Another important constructional dimension of the rotary atomizer is the gap width of the axial gap between the shaping air ring of the rotary atomizer on the one hand and the rear side of the bell cup on the other hand. It has proven to be advantageous to increase the axial gap width between the shaping air ring and the back of the bell cup. The axial gap between the shaping air ring on the one hand and the rear side of the bell cup on the other hand is therefore preferably larger than 3.0 mm, 4 mm, 4.5 mm, 5 mm or 5.2 mm, whereby a value of 5.3 mm has proven to be particularly advantageous. It should be mentioned here that the bell cup shaft is exposed in the axial gap between the shaping air ring and the rear side of the bell cup, preferably without an external cover, in order to favorably influence the pressure ratio to avoid backflow.

The pressure conditions in the bell cup system are also influenced by the outer diameter of the paint nozzle. Therefore, the paint nozzle preferably has an outer diameter of less than 4 mm, 3.5 mm, 3 mm or even less than 2.8 mm at its free end, whereby an outer diameter of 2.6 mm or 3.2 mm has proven to be particularly advantageous.

In the preferred embodiment of the disclosure, a distributor disc holder is mounted in the center of the bell cup as a separate component, as is known from the state of the art. The distributor disc is then mounted on the distributor disc holder. The paint nozzle protrudes through a central bore in the distributor disc holder, whereby the central bore preferably has an inner diameter of essentially 3.2 mm or 3.8 mm. The annular gap between the paint nozzle on the one hand and the surrounding distributor disc holder on the other hand preferably has a radial gap width of 0.2 mm-0.6 mm, whereby a value of 0.3 mm has proven to be particularly advantageous.

In addition to the annular gap between the paint nozzle on the one hand and the distributor disc holder on the other hand, the axial gap length should also be mentioned, which is preferably in the range of 4.5 mm-8.5 mm or 5.5 mm-7.5 mm, whereby a value of 6.5 mm has proven to be particularly advantageous.

In addition to the annular gap between the paint nozzle and the surrounding distributor disc holder, the axial cross-section of the annular gap should also be mentioned, which preferably has a cross-sectional area of 2 $mm^2$-7 $mm^2$, 3 $mm^2$-6 $mm^2$ or 4 $mm^2$-5 $mm^2$.

Finally, it should be mentioned that the disclosure does not only claim protection for the above described rotary atomizer. Rather, the disclosure also claims protection for a corresponding operating method which, in addition to the above-described design dimensions, also provides for certain operating parameters, such as the speed of the bell cup shaft, the flow rate of the coating agent and the flow rate of the shaping air. The above-mentioned design dimensions on the one hand and the above-mentioned operating parameters on the other hand are preferably coordinated with each other in such a way that the desired pressure conditions are achieved in the bell cup system in order to avoid the undesired backflow of the coating agent in the bell cup system. For this purpose, the air pressure at the outlet opening of the paint nozzle must be lower than the air pressure in the nozzle chamber of the bell cup and in the external rinsing channels so that no backflow of the coating agent occurs.

Other advantageous further developments of the disclosure are indicated in the dependent claims or are explained in more detail below together with the description of the preferred embodiment of the disclosure referring to the figures.

The drawings show a preferred embodiment of a rotary atomizer 1, which can be used for paint application in a painting plant for painting car body parts.

The rotary atomizer 1 has a bell cup shaft 2 which rotates during operation. The bell cup shaft 2 is hollow and is usually driven by a compressed air turbine, although the compressed air turbine is not shown for simplification.

A bell cup 3 is screwed onto the free end of the bell cup shaft 2, which in itself is known from the state of the art.

The paint to be applied is fed from the rotary atomizer 1 via a paint tube 4, which runs coaxially in the hollow bell cup shaft 2 of the rotary atomizer.

Figure 4:
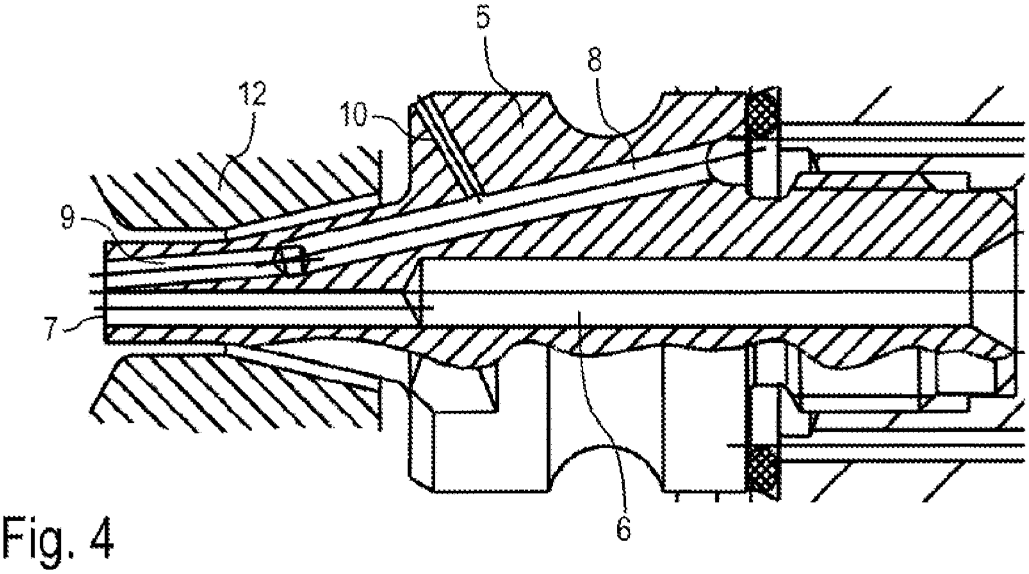
Figure 5:
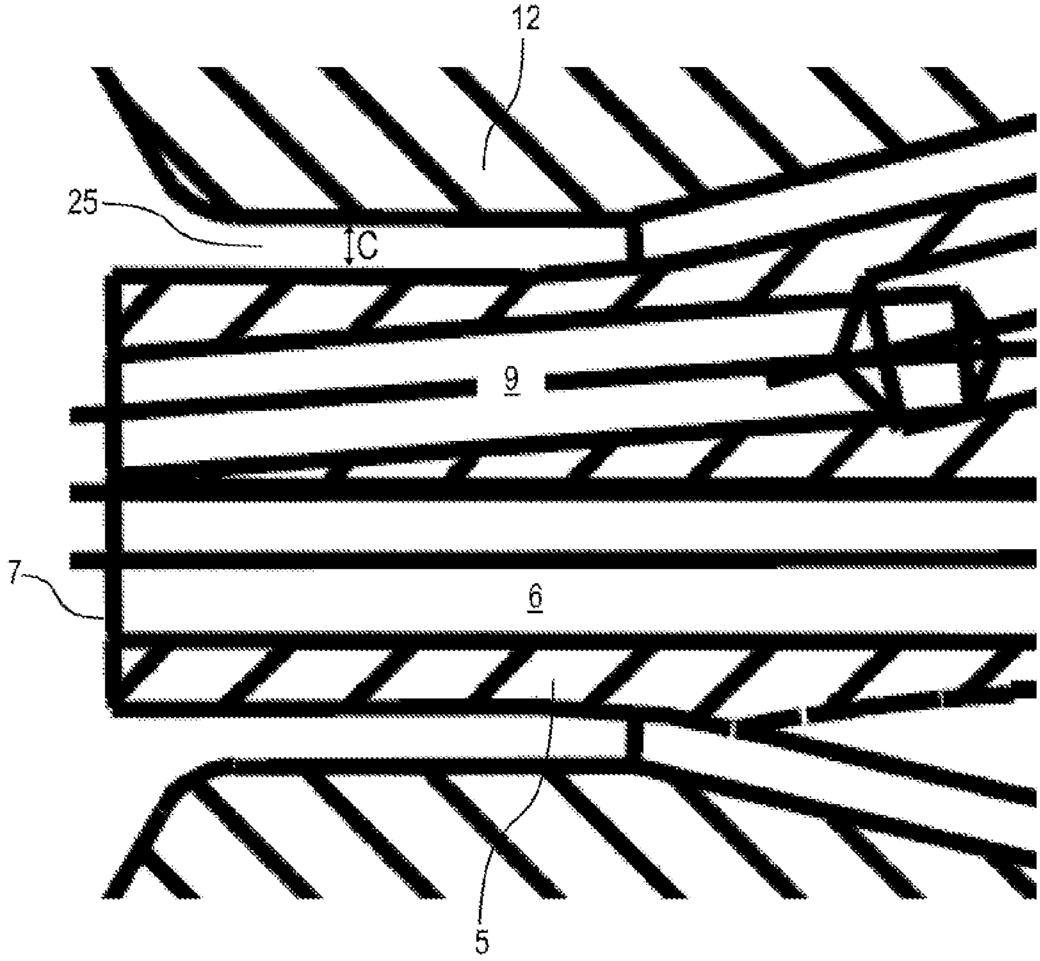

A paint nozzle 5 is inserted into the free end of the paint tube 4. This nozzle is shown in FIGS. 4 and 5 and is described in a similar form in DE 10 2009 037 604 A1. The paint nozzle 5, for example, initially has an axially continuous paint channel 6 that leads the paint to be applied from the paint tube 4 to an outlet opening 7 of the paint nozzle 5. Furthermore, the paint nozzle 5 contains a rinsing agent channel 8, which branches out in the direction of flow into two rinsing agent channels 9, 10. During a rinsing process, part of the rinsing agent supplied via the rinsing agent channel 8 is thus discharged axially forward through the rinsing agent channel 9 to rinse the bell cup 3. Another part of the rinsing agent is branched off via the rinsing agent channel 10 to rinse a nozzle chamber 11, which surrounds the paint nozzle 5.

In the center of the bell cup 3, a distributor disc holder 12 is mounted, which carries a distributor disc 13, whereby the distributor disc 13 is attached to the distributor disc holder 12 by several bolts 14 distributed around the circumference.

In the center of the distributor disc 13 there is a central bore 15, so that part of the paint emerging from the paint nozzle 5 can flow through the central bore 15 in the distributor disc 13 to wet the front surface of the distributor disc 13 with paint during operation.

Most of the paint emerging from the paint nozzle 5, on the other hand, is diverted radially outwards by the distributor disc 13 and passes through a gap 16 between the distributor disc 13 and an overflow surface 17 outwards to a spray edge 18 of the bell cup 3, where the paint is finally sprayed off.

In addition, the rotary atomizer 1 with the bell cup 3 also allows external rinsing of an outer circumferential surface 19 of the bell cup 3 to clean the outer circumferential surface 19 of the bell cup 3. For this purpose, external rinsing channels 20 are provided in the bell cup 3, distributed around the circumference, each consisting of two straight and angled tap holes. The outer rinsing channels 20 start from the nozzle chamber 11 and open out into an exterior rinsing chamber 21, whereby the rinsing agent can flow outwards from the exterior rinsing chamber 21 to the outer circumferential surface 19 of the bell cup 3 during a rinsing process, which is known from the state of the art.

Furthermore, it should be noted that the rotary atomizer 1 has a shaping air ring 22 in order to be able to shape the spray jet of the paint delivered by the bell cup 3, which is in itself known from the state of the art. For this purpose, the shaping air ring 22 can direct shaping air from behind onto the outer circumferential surface 19 of the bell cup 3 via a ring-shaped ring of shaping air nozzles 23. It should be mentioned that there is a gap 24 between the rear side of the bell cup 3 on the one hand and the shaping air ring 22 on the other hand, which has a certain axial gap width.

Within the scope of the disclosure, different construction dimensions of the rotary atomizer 1 and the bell cup 3 are relevant for achieving the inventive goal of changing the backflow of paint in the bell cup 3. The following construction dimensions are to be mentioned:

- Diameter A of the central bore in the distributor disc holder 12 of the bell cup 3,
- gap width B of the gap 16 between the distributor disc 13 and the overflow surface 17 of the bell cup 3,
- gap width C of an annular gap 25 between the distributor disc holder 12 of the bell cup 3 and the paint nozzle 5,
- gap width D of an annular gap between the paint nozzle 5 and the inner wall of the nozzle chamber 11,
- gap width E of an annular gap 27 between the paint tube 4 and the bell cup shaft 2,
- gap width F of an annular gap 28, which is formed by the exterior rinsing chamber 21 of the bell cup 3, and
- gap width G of the gap between the bell cup 3 and the shaping air ring 22.

The above mentioned construction dimensions of the bell cup 3 or the rotary atomizer are matched to each other in this embodiment in such a way that the air pressure at the outlet opening of the paint nozzle 5 is always lower than the air pressure in the nozzle chamber 11 and in the external rinsing channels 20 of the bell cup 3 during operation. This prevents a disturbing backflow of the paint to the rear.

The following values for the individual design dimensions have therefore proven to be advantageous:

A=3.2 mm or A=3.8 mm,
B=0.15 mm-0.2 mm,
C=0.3 mm,
D=1.7 mm,
E=0.75 mm,
F=3.25 mm,
G=5.3 mm.

Within the scope of the disclosure, deviations of ±30%, ±20%, ±10%, ±5% or ±2% are possible for the above mentioned values.

Furthermore, it should be mentioned that the number of the external rinsing channels 20 was reduced to six external rinsing channels 6 compared to the state of the art, which also has a positive effect on the pressure conditions.

The disclosure is not limited to the preferred embodiment described above. Rather, the disclosure also claims protection for the subject-matter and the features of the dependent claims independently of the claims referred to in each case and in particular also without the features of the main claim. The disclosure thus comprises different aspects of the disclosure which are protected independently of each other.

The invention claimed is:

1. A rotary atomizer for applying a spray jet of a coating agent to a component, comprising:

a) a shaping air ring to discharge shaping air to form the spray jet of the coating agent, b) a bell cup shaft rotating during operation, the bell cup shaft being hollow, c) a paint tube arranged substantially coaxially in the bell cup shaft, wherein the bell cup shaft and the paint tube enclose an annular gap with a certain gap width in a radial direction, d) a paint nozzle which is arranged substantially coaxially in the paint tube and discharges the coating agent to be applied substantially in an axial direction through an outlet opening, and e) a bell cup mounted on the bell cup shaft and rotating during operation with e1) a gap between a front side of the shaping air ring and a rear side of the bell cup with a certain gap width in the axial direction, e2) a central bore for axial feed-through of the paint nozzle with an annular gap between the bell cup and the paint nozzle with a certain gap width in the radial direction, e3) an annular spray edge for spraying the coating agent, e4) an outer circumferential surface, e5) an exterior rinsing chamber on the rear side of the bell cup for rinsing the outer circumferential surface with a rinsing agent, the exterior rinsing chamber forming an annular gap on an outside of the bell cup shaft with a specific gap width in the radial direction, e6) several exterior rinsing channels in the bell cup between the paint nozzle and the exterior rinsing chamber for feeding rinsing agent from the paint nozzle onto the outer circumferential surface of the bell cup for exterior rinsing of the bell cup e7) a nozzle chamber on the rear side of the bell cup for receiving the paint nozzle with an annular gap between the paint nozzle and an inner wall of the nozzle chamber with a certain gap width in the radial direction, e8) an overflow surface at a front face of the bell cup, wherein the coating agent to be applied, coming from the outlet opening of the paint nozzle, flows in operation outwards over the overflow surface to the spray edge of the bell cup, e9) a distributor disc for distributing the coating agent emerging from the outlet opening of the paint nozzle, wherein the distributor disc is arranged in the bell cup at a front side of the bell cup, directs the coating agent coming from the paint nozzle partly radially outwards onto the overflow surface of the bell cup and partly axially through a central bore in the distributor disc onto an end face of the distributor disc, wherein the distributor disc encloses with the overflow surface of the bell cup a gap with a certain gap width, e10) a distributor disc holder which is arranged in the bell cup and has a central bore with a specific diameter, the distributor disc being mounted on the distributor disc holder, and, f) wherein rotary atomizer is designed in such a way that an air pressure at the outlet opening of the paint nozzle during operation is lower than an air pressure in the nozzle chamber of the bell cup and in the exterior rinsing channels, in order to prevent a backflow of the coating agent from the outlet opening of the paint nozzle backwards in a direction of the nozzle chamber as a result of a pressure difference.

2. The rotary atomizer according to claim 1, wherein the following design dimensions of the rotary atomizer are matched to one another in such a way that the air pressure at the outlet opening of the paint nozzle during operation is lower than the air pressure in the nozzle chamber of the bell cup and in the exterior rinsing channels:

a) the diameter of the central bore in the distributor disc holder of the bell cup, b) the gap width of the gap between the distributor disc and the overflow surface of the bell cup, c) the gap width of the annular gap between the bell cup and the paint nozzle, d) the gap width of the annular gap between the paint nozzle and the inner wall of the nozzle chamber, e) the gap width of the annular gap between the bell cup shaft and the paint tube, f) the gap width of the annular gap of the exterior rinsing chamber on the outside of the bell cup shaft, and g) the gap width of the gap between the front side of the shaping air ring and the rear side of the bell cup.

3. The rotary atomizer according to claim 1, wherein a quantity of exterior rinsing channels in the bell cup is less than 65 to achieve a pressure ratio to prevent the backflow.

4. The rotary atomizer according to claim 1, wherein the exterior rinsing channels together have a total cross-sectional area smaller than 20 $mm^2$ to achieve a pressure ratio to prevent the backflow.

5. The rotary atomizer according to claim 1, wherein the exterior rinsing channels each have an internal diameter of 1 mm-2 mm in order to achieve a pressure ratio to prevent the backflow.

6. The rotary atomizer according to claim 1, wherein the exterior rinsing channels each have a total length of 5 mm-15 mm.

7. The rotary atomizer according to claim 1, wherein a) the exterior rinsing channels each consist of a first straight tap hole and a second straight tap hole, the first straight tap hole extending from the nozzle chamber to the second straight tap hole, the second straight tap hole extending from the first straight tap hole to the exterior rinsing chamber, and b) the second straight tap holes are shorter than the first straight tap holes.

8. The rotary atomizer according to claim 7, wherein the second straight tap holes each have a length of 0.5 mm-2 mm.

9. The rotary atomizer according to claim 8, wherein the first straight tap holes each have a length of 5 mm-10 mm.

10. The rotary atomizer according to claim 1, wherein the exterior rinsing chamber in the bell cup has an external diameter of more than 30.5 mm in order to achieve a pressure ratio to avoid the backflow.

11. The rotary atomizer according to claim 1, wherein the gap width of the gap between the overflow surface of the bell cup and the distributor disc is in the range of 0.1 mm-0.25 mm.

12. The rotary atomizer according to claim 1, wherein the gap between the overflow surface of the bell cup and the distributor disc has a gap length in a flow direction which is in the range of 3 mm-10 mm.

13. The rotary atomizer according to claim 1, wherein the nozzle chamber in the bell cup has an external diameter of more than 11 mm, in order to increase the gap width between the paint nozzle and the inner wall of the nozzle chamber and thereby to achieve a pressure ratio to reduce the backflow.

14. The rotary atomizer according to claim 1, wherein a) the gap between the shaping air ring and the rear side of the bell cup has a gap width which is greater than 3.0 mm, in order to achieve a pressure ratio to prevent the backflow, and b) the bell cup shaft is exposed in the gap between the shaping air ring and the rear side of the bell cup without an external cover in order to achieve the pressure ratio to prevent the backflow.

15. The rotary atomizer according to claim 1, wherein the paint nozzle has an outer diameter of less than 4 mm at a free end.

16. The rotary atomizer according to claim 1, wherein the central bore in the distributor disc holder has a diameter of substantially 3.2 mm or 3.8 mm.

17. The rotary atomizer according to claim 16, wherein an annular gap between the paint nozzle and the distributor disc holder has a radial gap width of 0.2 mm-0.6 mm.

18. The rotary atomizer according to claim 16, wherein an annular gap between the paint nozzle and the distributor disc holder has a length of 4.5 mm-8.5 mm.

19. The rotary atomizer according to claim 16, wherein an annular gap between the paint nozzle and the distributor disc holder has a cross-sectional area of 2 $mm^2$-7 $mm^2$ in an axial cross section.

20. Operating method for a rotary atomizer in accordance with claim 1, wherein the air pressure at the outlet opening of the paint nozzle is lower than the air pressure in the nozzle chamber of the bell cup and in the exterior rinsing channels in order to prevent a backflow of the coating agent from the outlet opening of the paint nozzle backwards in the direction of the nozzle chamber due to the pressure difference.

21. Operating method according to claim 20, wherein a) the bell cup shaft rotates at a certain speed, b) the paint nozzle discharges the coating agent with a certain flow rate, c) the shaping air ring discharges the shaping air with a certain flow rate, and d) the following design dimensions and operating parameters are matched to one another in such a way that the air pressure at the outlet opening of the paint nozzle is lower than the air pressure in the nozzle chamber of the bell cup and in the exterior rinsing channels, in order to prevent a backflow of the coating agent from the outlet opening of the paint nozzle backwards in the direction of the nozzle chamber as a result of the pressure difference:

d1) the diameter of the central bore in the distributor disc holder of the bell cup, d2) the gap width of the gap between the distributor disc and the overflow surface of the bell cup, d3) the gap width of the annular gap between the bell cup and the paint nozzle, d4) the gap width of the annular gap between the paint nozzle and the inner wall of the nozzle chamber, d5) the gap width of the annular gap between the bell cup shaft and the internal paint tube, d6) the gap width of the annular gap of the exterior rinsing chamber on the outside of the bell cup shaft, and d7) the gap width of the gap between the front side of the shaping air ring and the rear side of the bell cup, d8) the speed of the bell cup shaft, d9) the flow rate of the coating agent, and d10) the flow rate of the shaping air.

22. A coating robot with several movable axes and the rotary atomizer according to claim 1.

* * * * *